United States Patent
Choi et al.

(10) Patent No.: US 9,478,777 B2
(45) Date of Patent: *Oct. 25, 2016

(54) ELECTRONIC DEVICE HAVING DETACHABLE BATTERY PACK

(71) Applicant: Samsung Electronics Co., Ltd., Gyeonggi-do (KR)

(72) Inventors: Jong-Min Choi, Gyeonggi-do (KR); Hong-Moon Chun, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/837,409

(22) Filed: Aug. 27, 2015

(65) Prior Publication Data

US 2015/0364733 A1    Dec. 17, 2015

Related U.S. Application Data

(63) Continuation of application No. 14/197,663, filed on Mar. 5, 2014.

(30) Foreign Application Priority Data

Mar. 11, 2013  (KR) .......................... 10-2013-0025394

(51) Int. Cl.
*H01M 2/10* (2006.01)
*G06F 1/16* (2006.01)
*H04B 1/3883* (2015.01)
*H04M 1/02* (2006.01)
*H04B 1/3888* (2015.01)

(52) U.S. Cl.
CPC .......... *H01M 2/1066* (2013.01); *G06F 1/1635* (2013.01); *H04B 1/3883* (2013.01); *H04B 1/3888* (2013.01); *H04M 1/0262* (2013.01); *H01M 2220/30* (2013.01)

(58) Field of Classification Search
CPC . G06F 1/1635; H04B 1/3883; H04B 1/3888; H01M 2/1066; H01M 2220/30; H04M 1/0262

See application file for complete search history.

(56) References Cited

U.S. PATENT DOCUMENTS

| 5,317,247 | A  | 5/1994  | Chong et al. |
| 5,933,330 | A  | 8/1999  | Beutler et al. |
| 7,579,107 | B2 | 8/2009  | Lu |
| 8,355,760 | B2 | 1/2013  | Kim |
| 2002/0037748 | A1 | 3/2002 | Matsumoto |
| 2006/0220611 | A1 | 10/2006 | Choi |

(Continued)

FOREIGN PATENT DOCUMENTS

| CN | 101167198 A | 4/2008 |
| CN | 101241974 A | 8/2008 |

(Continued)

OTHER PUBLICATIONS

Chinese Search Report, dated May 30, 2016.

*Primary Examiner* — Muhammad Siddiquee

(74) *Attorney, Agent, or Firm* — Cha & Reiter, LLC

(57) ABSTRACT

An electronic device may include a battery pack and a battery pack mount portion. The battery pack may be mounted or secured within the battery pack mount portion in such a way that the battery pack does not influence or apply pressure to neighboring structures. For examples, the battery pack may include at least one eat protrusion that is received within at least one recess formed in the battery pack mount portion.

14 Claims, 8 Drawing Sheets

(56) References Cited

U.S. PATENT DOCUMENTS

| | | | |
|---|---|---|---|
| 2008/0146293 A1* | 6/2008 | Kim | H04M 1/0252 455/575.1 |
| 2008/0193829 A1* | 8/2008 | Lu | H01M 2/1066 429/100 |
| 2009/0072785 A1 | 3/2009 | Moon | |
| 2010/0143793 A1 | 6/2010 | Yamamoto | |
| 2012/0015216 A1 | 1/2012 | Park et al. | |

FOREIGN PATENT DOCUMENTS

| | | |
|---|---|---|
| CN | 201557139 U | 8/2010 |
| EP | 0 712 226 A1 | 5/1996 |
| FR | 2 835 681 A3 | 8/2003 |
| KR | 10-2006-0096830 A | 9/2006 |
| KR | 10-2008-0017321 A | 2/2008 |
| KR | 10-0810266 B1 | 2/2008 |
| KR | 10-2009-0005438 A | 1/2009 |

* cited by examiner

ELECTRONIC DEVICE HAVING DETACHABLE BATTERY PACK

CROSS REFERENCE TO RELATED APPLICATIONS

This application is a Continuation of U.S. patent application Ser. No. 14/197,663 filed on Mar. 5, 2014 which claims the benefit of priority under 35 U.S.C. §119(a) of a Korean patent application filed in the Korean Intellectual Property Office on Mar. 11, 2013 and assigned Serial No. 10-2013-0025394, the entire disclosure of which is hereby incorporated by reference.

BACKGROUND

1. Technical Field

The present disclosure relates to an electronic device having a detachable battery pack.

2. Description of the Related Art

As multimedia technology continues to develop, the functionality of electronic devices is increasing. Generally, there has been a convergence of technology such that a single device may perform functions that were previously performed by several different standalone electronic devices.

Mobile terminals are electronic devices that are commonly known as "smartphones". Mobile terminals have entered the mainstream of daily life. These mobile terminals often include a large-sized touch type display module and a mega-pixel camera module. The inclusion of such components enable a smartphone to not only provide a communication function, but also to provide other functions such as the ability to photograph pictures and record motion pictures. Mobile terminals may also reproduce multimedia contents such as music, moving pictures, and the like. They may also provide access a network to allow a user to browse the web or internet. As the performance of mobile terminals, e.g., processor performance, continues to improve, the functionality of smartphones is increasing such that the primary function of these devices is no longer just communication.

The above-described electronic devices require a power supply means, such as a battery pack, which is capable of providing power for all of the above-described functions. Often, a battery pack is detachably installed within the electronic device, and may be separated from the electronic device and charged using a separate adapter for charging.

Generally, the increase in the functionality of electronic devices has caused a corresponding increase in the power requirements for such devices to operate. These power requirements have led to battery packs having a greater capacity to store power. As the capacity of power packs increases, the physical size of the battery pack has also increased. In the case of a mobile terminal, the battery pack typically occupies sixty (60) percent or more of the space within the mobile terminal. As the power requirements of electronic devices continue to increase, the battery packs that power these devices are likely to become physically larger such that the space within the electronic devices that is occupied by the battery packs will correspondingly become greater.

When a battery pack having a large volume is mounted inside an electronic device, it is desirable that its position within the electronic device is maintained without influencing or being influenced (e.g., applying excessive forces) by neighboring structures within the electronic device.

SUMMARY

An aspect of the present disclosure is to address at least the above-mentioned problems and/or disadvantages and to provide at least the advantages described below. In an embodiment, an electronic device may include a battery pack having a relatively large volume and a high capacity.

In another embodiment, an electronic device may include a battery pack that is configured such that it is not deformed (e.g., by external forces acting upon the electronic device or between the battery pack and its neighboring components) after it is mounted in the electronic device.

In yet another embodiment, an electronic device may include a battery pack configured such that it is not deformed (e.g., by external forces acting upon the electronic device or between the battery pack and its neighboring components) after it is mounted without separate limitation in design or extension of a space.

In a still further embodiment, an electronic device may include a battery pack that it is easily detachable from the electronic device.

In yet a further embodiment, an electronic device may include a battery pack configured to prevent floating or movement of the mounted battery pack relative to other components of the electronic device and/or also to prevent destruction of the battery pack.

In another embodiment, an electronic device may include a case frame having a battery pack mount portion and a battery pack mounted in the battery pack mount portion. The battery pack may be used as a power supply means. One or more seat protrusion may be formed to protrude to an outer direction from at least one end of the battery pack. A recess may be formed in the battery pack mount portion. The seat protrusion may be seated within the recess. The seat protrusion may be hooked at the recess in such a way that it is seated in the recess such that the battery pack may not pressurize a backside of the battery pack mount portion.

BRIEF DESCRIPTION OF THE DRAWINGS

The above and other aspects, features and advantages of certain exemplary embodiments of the present invention will be more apparent from the following description taken in conjunction with the accompanying drawings in which.

DETAILED DESCRIPTION

Figure 1:
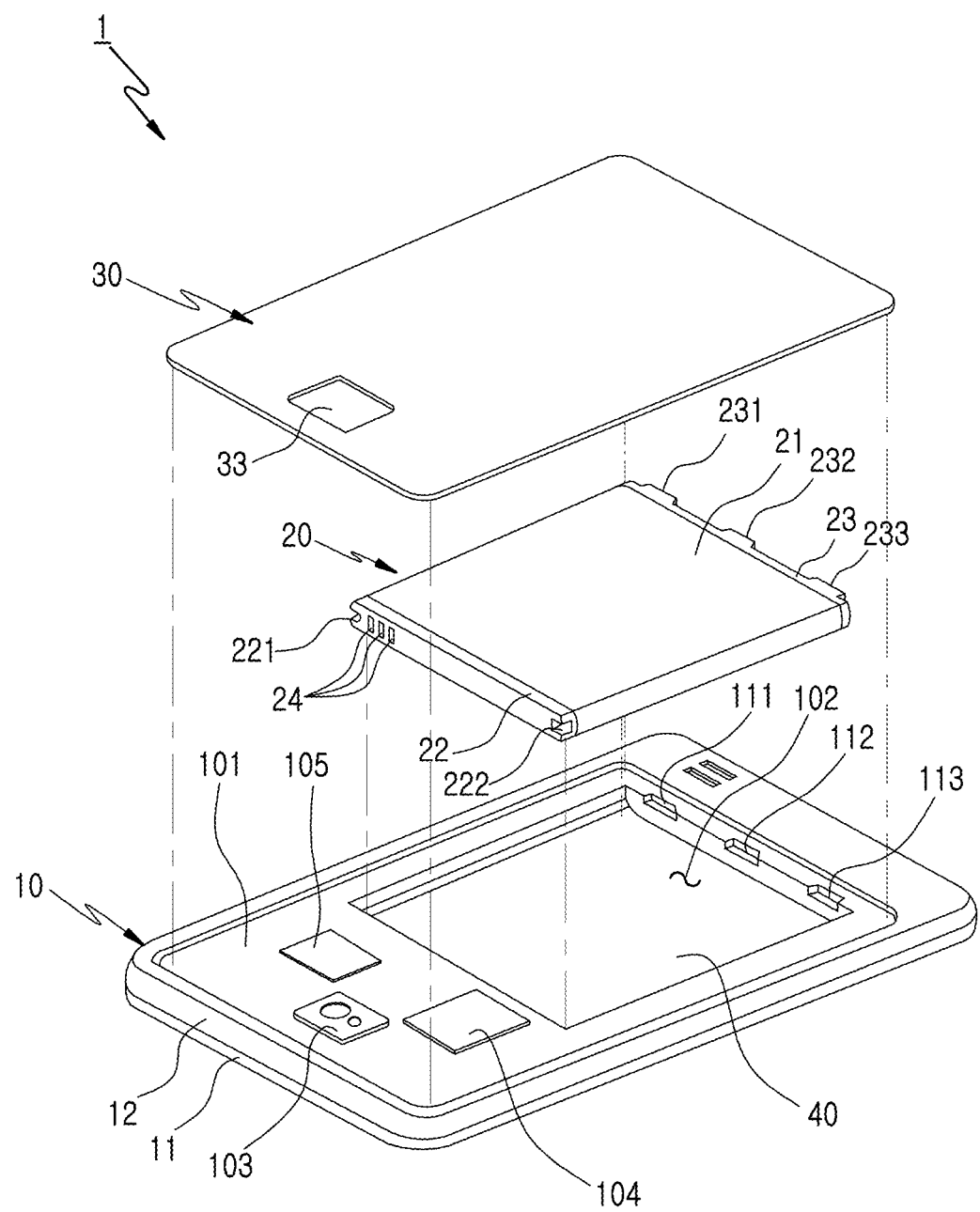
FIG. 1 is an exploded perspective view of an electronic device having a battery pack according an embodiment of the present disclosure.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are to be broadly construed in light of the present specification and are not to be limited to any particular dictionary definition as they are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents. Throughout the accompanying drawings, like reference numerals will be understood to refer to like parts, components, and structures.

It is to be understood that although a mobile terminal having a display module has been illustrated and explained in describing embodiments of the present invention, the presently described invention is not limited to a mobile terminal but is applicable to electronic devices more generally. For example, the present invention is applicable to various electronic devices having a detachable battery pack such as a Personal Digital Assistant (PDA), a laptop computer, a mobile phone, a smartphone, a netbook, a Mobile Internet Device (MID), an Ultra Mobile Personal Computer (UMPC), a tablet PC, a navigation, an MP3 player, etc.

In an embodiment, an electronic device may include a case frame having a battery pack mount portion and a battery pack mounted in the battery pack mount portion. The battery pack may be used as a power supply means. One or more seat protrusion may be formed to protrude to an outer direction from at least one end of the battery pack. A recess may be formed in the battery pack mount portion. The seat protrusion may be seated within the recess. The seat protrusion may be hooked at the recess in such a way that it is seated in the recess such that the battery pack may not pressurize a backside of the battery pack mount portion.

In a still further embodiment, a plurality of seat protrusions may protrude at predetermined intervals to an outer direction from one end of the battery pack.

In yet another embodiment, the seat protrusion may be formed to protrude in a rib shape from a side of the battery pack.

In yet another embodiment, the seat protrusion may be installed at a lower end of the battery pack.

In a still further embodiment, the seat protrusion may be at least one of support bodies formed of an insulating synthetic resin supporting a battery cell of the battery pack.

In a further embodiment, both a left and a right side of the battery pack mount portion may be formed in a bent shape entering in a direction of the battery pack mount portion toward a lower side thereof in order to support both the left and right sides of the battery pack.

In yet another embodiment, a backside of the battery pack mount portion may include at least one of a sheet plate, a plastic sheet, and a conductive tape mounted with a case frame such that it is separable.

In another embodiment, the battery pack may include a battery cell, a first support body formed of an insulating synthetic resin that is installed to support the battery cell on one side of the battery cell, and a second support body formed of an insulating synthetic resin that is installed in a direction facing the first support body.

In a further embodiment, the seat protrusion may be formed on the second support body.

In another embodiment, concave recesses may be formed in both a left and a right side of the first support body, and protrusions configured to fit in the concave recesses may protrude on a corresponding position of the battery pack mount portion.

In a still further embodiment, the battery pack mount portion may have a mount space that is positioned lower relative to a backside of the electronic device.

In another embodiment, the battery pack may be mounted in the battery pack mount portion and an upper side of the battery pack may be configured such that it is not higher relative to a backside of the electronic device.

In a still further embodiment, the seat protrusion may be configured such that it does not protrude beyond the upper side of the battery pack or the backside of the electronic device when the seat protrusion is seated in the recess.

FIG. 1 is a exploded perspective view illustrating an electronic device 1 having a battery pack 20 according an embodiment of the present disclosure.

Referring to FIG. 1, the electronic device 1 may include a main body 10, a battery pack 20 that is detachably installed in the backside of the main body 10, and a cover 30 mounted in a portion of the backside of the main body 10, which is configured to protect the battery pack 20 and various components within the electronic device 1. In particular, the cover 30 protects the battery pack 20 by inhibiting or preventing it from being exposed to the outside or detached from the electronic device. An opening 33 may be formed through the cover 30 through which a component (for example, a camera module 103) that is installed in the main body 10 of the electronic device 1 may pass through and exposed to the outside of the electronic device 1.

The main body 10 of the electronic device 1 may include an upper case frame 11 and a lower case frame 12 that are coupled to each other, and may receive various electronic components, which may perform various electronic function, therein. A large-screen display module (not shown) may be installed on the front side of the electronic device 1, and may include a touch sensor for receiving a data input.

A cover mount portion 101 may be formed in the backside of the electronic device 1, and various components may be exposed through the cover mount portion 101. The components that are exposed through the cover mount portion 101 may be detachably installed or operatively coupled to the electronic device 1. These components may include the battery pack 20 and other components such as a Subscriber Identity Module (SIM) card mount portion 104 in which a SIM card is installed, a memory card mount portion 105 in which a small memory card is installed, etc. The electronic device 1 may include the camera module 103, which may be exposed to the outside of the electronic device 1 to allow for photographing or shooting of an object.

Furthermore, the cover mount portion 101 may be configured such that the outer side of the cover mount portion 101 shares a side with the lower case frame 12 of the main body 10 when the cover mount portion 101 is coupled to the main body 10. The cover mount portion 101 may be formed to have a recess having a depth that is substantially the same thickness as the cover 30. Therefore, when the cover 30 is mounted in the lower case frame 12 of the electronic device 1, the cover 30 and the lower case frame 12 may be in the same plane. A plurality of hooking protrusions (not shown) may be formed at predetermined intervals along the edge of the cover 30. A plurality of hooking recesses (not shown) may be formed in the cover mount portion 101 of the main body 10 of the electronic device 1 so that the cover 30 may be fixed in the cover mount portion 101 in such a way that the hooking protrusions are forcibly fit into the hooking recesses.

A battery pack mount portion 102 may have a surface that is positioned along a plane that is lower than that of a surface of the cover mount portion 102. The battery pack 20 may be mounted within a recess that is formed in the cover mount portion 101. A separate sheet plate 40 may space the backside of the battery pack mount portion 102 apart from other components such as the display module. The sides of the battery pack mount portion 102 may support the sides of the battery pack 20.

The battery pack 20 may include a battery cell 21, a first support body 22, and a second support body 23. The first support body 22 and the second support body 23 may support the battery cell 21 at opposing ends thereof. The first and second support bodies 22 and 23 may be formed of an insulator, such as a synthetic resin.

The first support body 22 may include a plurality of terminals 24 that are electrically connected to the battery cell 21 inside the battery pack 20 and exposed to the outside of the batter pack 20. The terminals 24 may be electrically connected to a connector (not shown) installed in the battery pack mount portion 102 of the main body 10. Concave recesses 221 and 222 may be formed at opposing ends of the first support body 22 and coupled to protrusions that are formed in the battery pack mount portion 102 of the main body 10 to guide mounting of the battery pack 20 and to prevent detachment of the battery pack 20 from the battery pack mount portion 102. The concave recesses 221 and 222 may also or alternatively be formed at opposing ends of the first support body 22. Furthermore, similar recesses (not shown) may also or alternatively be formed at corresponding positions of the battery pack mount portion 102 of the main body 10, and coupled to corresponding protrusions (not shown) formed on the battery pack 20.

According to an embodiment of the present invention, a plurality of seat protrusions 231, 232, 233 may protrude at predetermined intervals from the second support body 23. When the battery pack 20 is mounted in the battery pack mount portion 102 of the main body 10, the seat protrusions 231, 232, 233 may be seated in recesses 111, 112, 113 having a groove shape at corresponding positions along a side of the battery pack mount portion 102. Consequently, when the battery pack 20 is mounted in the battery pack mount portion 102, the protrusions 231, 232, 233 formed in the battery pack mount portion 102 of the main body 10 fit in the concave recesses 111, 112, 113 of the first support body 22. Also, since the plurality of seat protrusions 231, 232, 233 of the second support body 23 are hooked at the recesses 111, 112, 113 formed in the corresponding positions of the battery pack mount portion 102 of the main body 10, the battery pack 20 does not influence (e.g., apply pressure or force to) the sheet plate 40 disposed on the lower side of the battery pack mount portion 102.

The described battery pack mount structure has a different configuration from the conventional battery pack mount structure. In the conventional art, only one side of the battery pack is supported by a battery pack mount portion, and the other side (for example, a 15 second injection direction) is supported by a sheet plate disposed on the lower side of the battery pack mount portion.

Therefore, in the conventional art, after the battery pack is mounted in the battery pack mount portion of the main body, the battery pack will strike the sheet plate due to an external pressure or external impulse, which may result in the sheet plate becoming warped and deformed. Consequently, a mount tolerance of the battery pack has to be greater, resulting in the battery pack floating or moving arbitrarily and increasing the potential of a malfunction in electrical connection with the main body occurs.

Furthermore, since both the left and right of the battery pack mount portion are conventionally formed to support both sides of the battery pack using an assembly structure of the case frame of the electronic device, the battery pack is designed to be tightly mounted in the battery pack mount portion. The conventional configuration may result in deformation or destruction of the case frame of the electronic device when the volume or size of the battery pack increases, for example, from being fully or overly charged, causing it to press against neighboring structures or components.

In contrast, according to an embodiment of the present disclosure, the plurality of seat protrusions 231, 232, 233 are formed on the second support body 23, which is on a side of the battery pack 20, and the protrusions 231, 232, 233 are seated and hooked at the recesses 111, 112, 113 formed in the corresponding positions of the battery pack mount portion 102. Therefore, the first and second support bodies 22 and 23, which are located at upper and lower ends of the battery pack 20, have a self-support structure that is independent of the sheet plate 40. This configuration reduces the likelihood that, the sheet plate 40 will be deformed. Due to this support structure, both the left and right injected structures inside the battery pack mount portion 102 of the case frame 11 of the electronic device 1 supporting both the left and right of the battery pack 20 may be designed to include a marginal space that may allow a volume increase in size of the battery pack 20 that may result from charging the battery pack 20.

Figure 2:
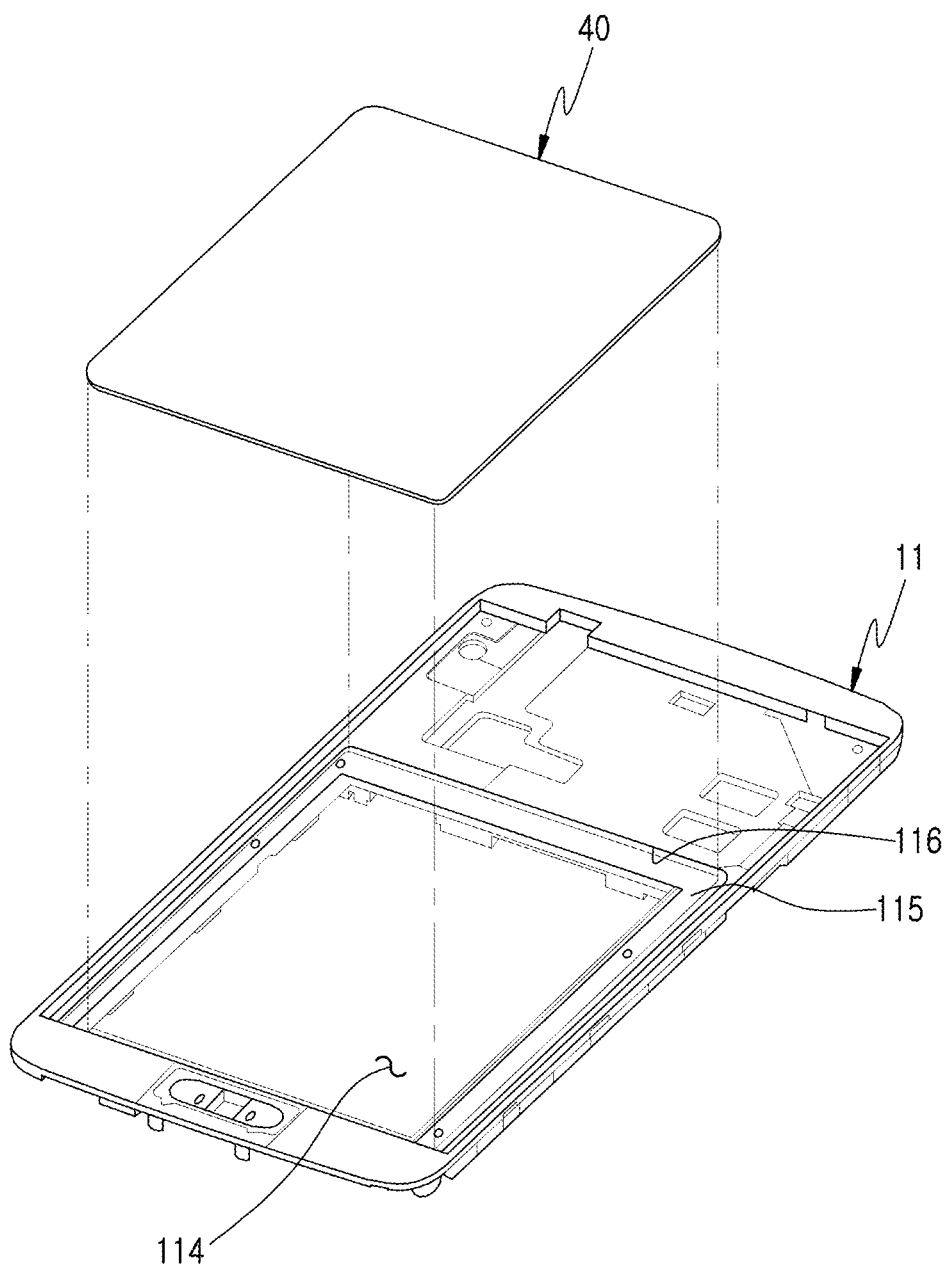
FIG. 2 is a perspective view of a sheet plate is shown relative to an upper case frame of FIG. 1.
Figure 3:
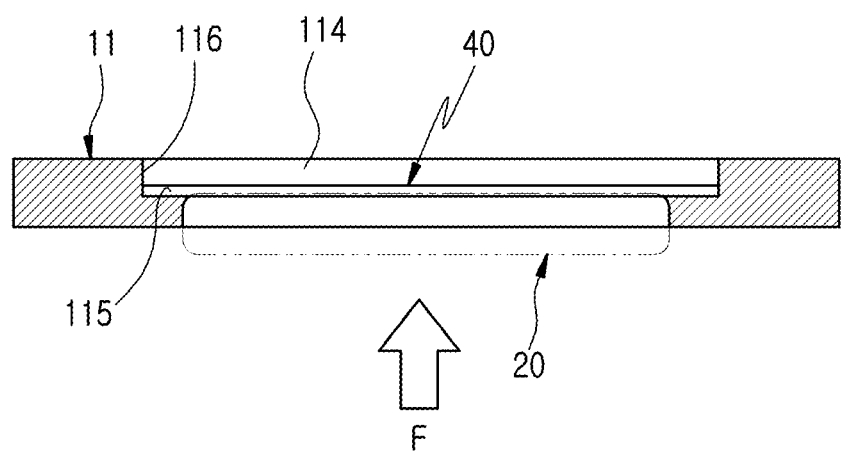
FIG. 3 is a cross-sectional view of the electronic device FIG. 1 shown with the battery pack mounted therein.

FIG. 2 is a perspective view of the sheet plate 40 shown relative the upper case frame 11 of FIG. 1. FIG. 3 is a cross-sectional view of a portion of the electronic device 1 of FIG. 1 shown with the battery pack 20 mounted therein.

Referring to FIGS. 2 and 3, an opening 114 of a predetermined size is formed in the upper case frame 11. The opening 114 may be utilized as a space for mounting the battery pack 20 therein, and the sheet plate 40 may be disposed at a depth within the opening 114 to block the opening 114. The battery pack 20 may be mounted within the upper case frame 11, and may have a thickness that is substantially equal to the thickness of the upper case frame 11 minus the depth at which sheet plate 40 is disposed within the upper case frame 11.

The upper case frame 11 may be formed from a magnesium casting, and may, for example, be formed using die-casting but is not limited thereto and may be replaced by an injection material formed of a synthetic resin. The display module (not shown) of the electronic device 1 may be mounted on the upper side of the upper case frame 11.

Also, the sheet plate 40 may be formed of metal having a relatively fine thickness and strength. The materials for the sheet plate may be aluminum, SUS, etc. The sheet plate may be realized using a composite material such as GFRP and CFRP, which although not metal have similar properties to that of metal. Furthermore, the sheet plate 40 may be safely formed of inorganic materials such as glass or high polymer materials such as PC, etc.

As shown in FIG. 3, a seat surface 115 having a predetermined width may be formed in the opening 114 of the upper case frame 11 along the inner periphery of the opening 114 such that it is lower than the surface of the upper case frame 11, thereby forming a step threshold 116 in the boundary portion between the seat surface 115 and the upper case frame 11. Therefore, a predetermined portion of the edge of the sheet plate 40 contacts the seat surface 115 formed in the opening 114 of the upper case frame 11, and the sheet plate 40 is supported or guided by the step threshold 116 and seated upon and coupled to the seat surface 115. At this point, the sheet plate 40 may be fixed to the upper case frame 11, for example, with an adhesive means such as bonding, a double-sided adhesive tape, etc. The step threshold 116 may be generated by a mechanical structure such as various ribs, etc. that are formed in the neighborhood of the inner edge of the opening 114 besides the seat surface.

Although sheet plate 40 is depicted in the appended figures as being rectangular, the sheet plate 40 may have other configurations. For example, the sheet plate may be formed in various shapes depending on the shape of the opening 114 of the upper case frame 11 to which the sheet plate is applied.

Referring to FIGS. 1 and 3, when the battery pack 20 is mounted in the electronic device 1, the concave recesses 221 and 222 formed in the first support body 22 of the battery pack 20 couple with corresponding protrusions (not shown) of the battery pack mount portion 102, and the plurality of seat protrusions 231, 232, 233 formed on the second support body 23 are supported in a structure of being hooked at the recesses 111, 112, 113 of the battery pack mount portion 102 so that the sheet plate 40 is not influenced by the battery pack 20. In particular, even when an external force F (FIG. 3) is applied to the central portion of the battery pack 20 after the battery pack 20 is mounted in the battery pack mount portion 102, the sheet plate 40 is not struck by the battery pack 20 and is not deformed by the external force F.

Since this structure allows the upper and lower ends, as well as the left and right sides of the battery pack 20, to be completely supported by the case frames 11 and 12 of the electronic device 1, the metal sheet plate 40 may be replaced by a lightweight plastic sheet or a conductive tape, which may contribute to reduction of the entire thickness of the electronic device. Alternatively, the sheet plate 40 may be removed altogether, exposing the backside of the display module, and contributing to weight reduction and slimness of the electronic device 1.

Figure 4:
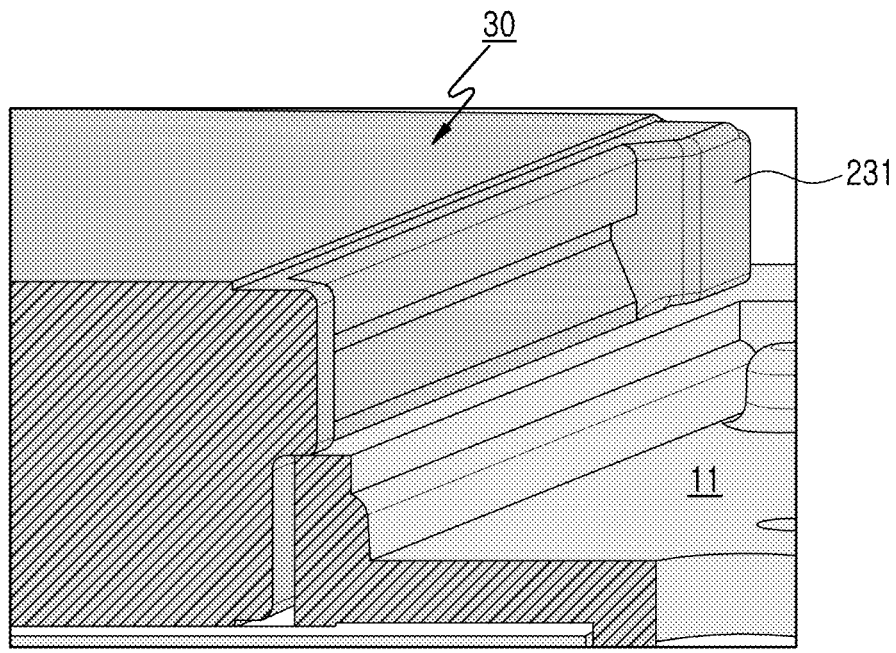
FIG. 4 is a cutaway perspective view of FIG. 1.
Figure 5:
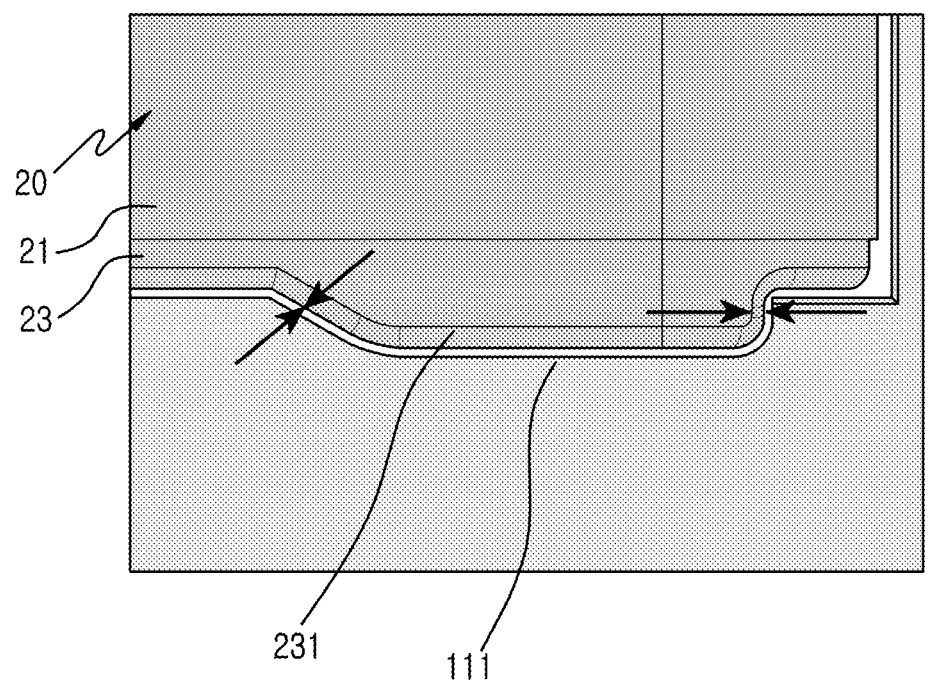
FIG. 5 is a plan view of a portion of the electronic device of FIG. 1.
Figure 6:
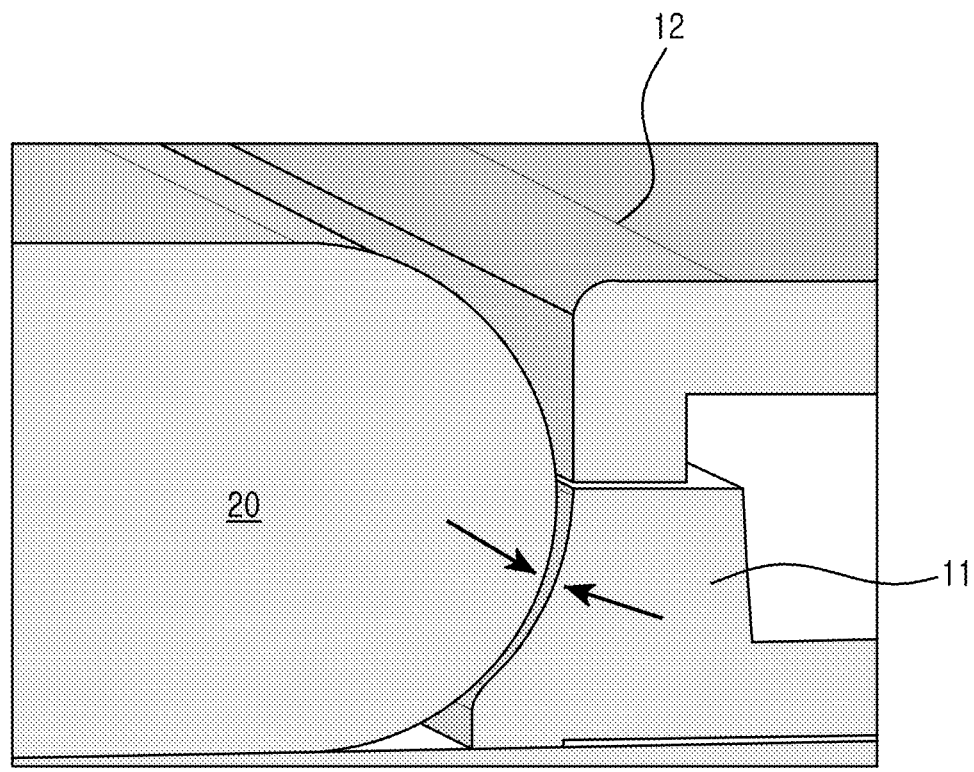
FIG. 6 is a cutaway perspective view of a portion of the electronic device of FIG. 1 shown with the battery pack of FIG. 1 mounted therein.

FIG. 4 is a cutaway perspective view of FIG. 1 in which the battery pack 20 is mounted in the electronic device 1 according an embodiment of the present disclosure, FIG. 5 is a plan view partially illustrating a state where the battery pack 20 of FIG. 1 is mounted in the electronic device according to another embodiment of the present disclosure. FIG. 6 is a perspective view illustrating the battery pack 20 of FIG. 1 is mounted in the electronic device according a still further embodiment of the present invention.

Referring to FIGS. 4 to 6, with the concave recesses 221 and 222 of the first support body 22 of the battery pack 20 coupled to corresponding protrusions (not shown) formed on the battery pack mount portion 102 of the main body 10 of the electronic device, the second support body 23 is lowered down in the direction of the battery pack mount portion 102. At this point, the seat protrusions 231, 232, 233 of the second support body 23 are hooked in such a way that the seat protrusions 231, 232, 233 are seated in the recesses 111, 112, 113 formed in the corresponding positions of the battery pack mount portion 102 so that both the upper and lower ends of the battery pack 20 may be supported.

As shown in FIG. 6, both the left and right of the battery pack 20 may be supported by the injection structure of the upper and lower case frames 11 and 12 of the main body 10.

As shown in FIG. 5, the seat protrusions 231, 232, 233 of the battery pack 20 and the recesses 111, 112, 113 formed in the upper case frame 11 of the battery pack mount portion 102 are designed such that an assembly interval (the space between each pair of opposing arrows of FIG. 5) is 0.1 mm or less so that left and right movement of the battery pack 20 is minimized after the battery pack 20 is mounted in the battery pack mount portion 102.

Also, as shown in FIG. 6, the space (the arrow portion of FIG. 6) between a support portion of the upper case frame 11 and lower case frames 12 for supporting the lateral sides of the battery pack 20 and the battery pack 20 may be about 0.05 mm or more, destruction of the case frame by a volume increase when the battery pack 20 is fully charged may be prevented in advance.

Figure 7:
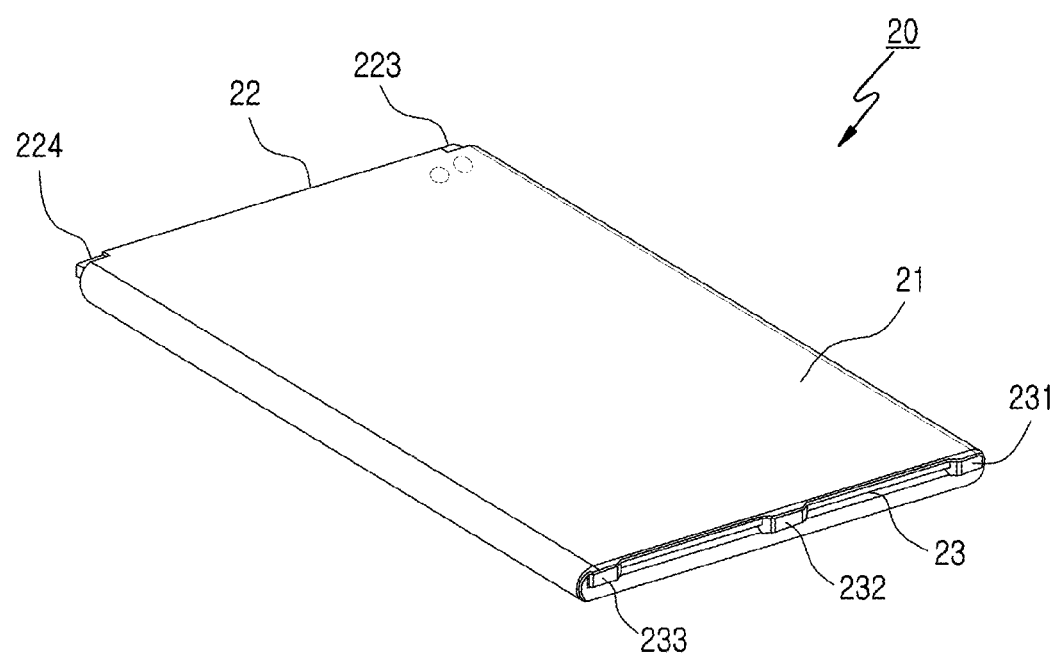
FIG. 7 is a perspective views illustrating the battery pack of FIG. 1.
Figure 8:
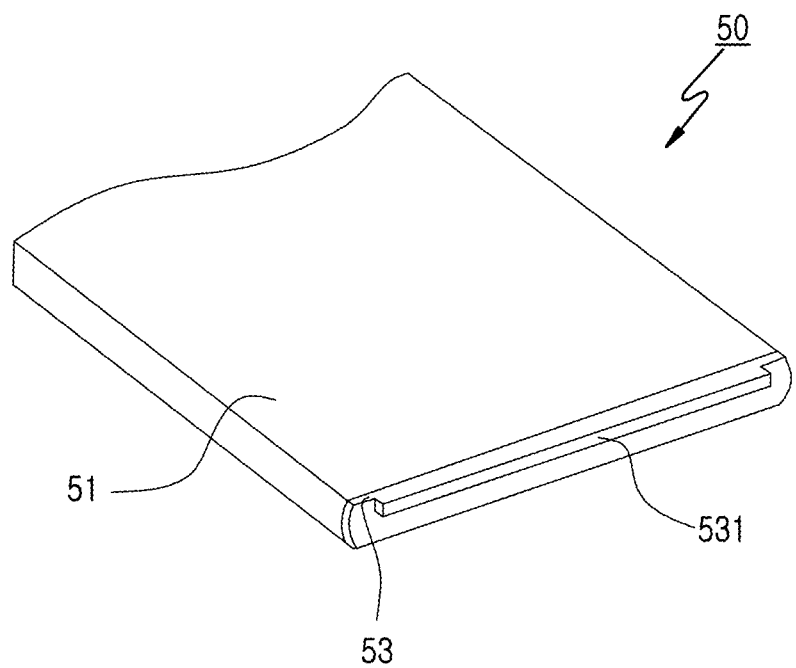
FIG. 8 is a cutaway perspective view of a battery pack according to another embodiment of the present disclosure.

FIGS. 7 and 8 are perspective views illustrating a battery pack according an embodiment of the present disclosure.

Referring to FIG. 7, the battery pack 20 may include a battery cell 21, a first support body 22 and a second support body 23 installed at both ends of the battery cell. A pair of protrusions 223 and 224 which are different from the concave recesses 221 and 222 of the battery pack 20 of FIG. 1 may protrude from both ends of the first support body 22. A pair of concave recesses may be formed in the corresponding positions of the battery pack mount portion 102 of the electronic device 1 in which the battery pack 20 is mounted. Also, a plurality of seat protrusions 231, 232, 233 may be formed having a predetermined shape on the second support body 23 so that the seat protrusions 231, 232, 233 may be seated in the recesses 111, 112, 113 in such a way that the seat protrusions 231, 232, 233 are hooked at the recesses 111, 112, 113 that are formed in the battery pack mount portion 102 of the main body 10.

With reference to FIG. 8, a battery pack 50, which is substantially similar to the battery pack 20 except in the ways explicitly stated herein, will now be described. The battery pack 50 includes a battery cell 51 and a seat rib 531 that extends in a widthwise direction along substantially an entire side of a support body 53 that is installed on one side of the battery cell 51.

Although not shown in the accompanying figures, in addition to the seat protrusions 231, 232, 233 or the seat rib 531 protruding from the support body on one side of the battery pack 20 and 50 respectively, protrusions having a hooking structure may be formed in various shapes. Such protrusions, which facilitate securing or mounting the battery pack to battery pack mount portion 102 of the electronic device 1, may also prevent an external force from being transmitted to neighboring components (for example, the sheet plate, the display module, etc.).

The electronic device according to an embodiment of the present disclosure may prevent destruction of structures that neighbor the battery pack and of the battery pack itself by external force by allowing the battery pack to be easily detached, thereby preventing the force from being transmitted between the battery pack and its neighboring structures.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An electronic device comprising:
a battery pack having a battery cell, a first support body, and a second support body, the first support body and the second support body provided at opposing ends of the battery cell, and the second support body including one or more seat protrusions protruding from one end of the second support body; and
a battery pack mount portion having an opening with a sheet plate disposed therein at a backside of the battery pack mount portion and one or more recesses arranged along one side of the battery pack mount portion that correspond to the one or more seat protrusions protruding from the second support body,
wherein the one or more seat protrusions of the second support body are seated within the one or more recesses of the battery pack mount portion when the battery pack is mounted to the battery pack mount portion, and
wherein one or more recesses are formed on the first support body of the battery cell, and wherein one or more protrusions are formed in the battery pack mount portion, configured to fit in the one or more recesses of the first support body of the battery cell and protrude on corresponding positions of the battery pack mount portion.

2. The electronic device of claim 1, wherein the sheet plate is disposed at a depth within the opening to block the opening, and wherein when the battery pack is mounted the battery pack overlies the sheet plate.

3. The electronic device of claim 1, wherein a plurality of the one or more seat protrusions protrude at a predetermined interval to an outer direction from the second support body.

4. The electronic device of claim 1, wherein the one or more seat protrusions are formed to protrude in a rib shape from the second support body.

5. The electronic device of claim 1, wherein both a left and a right side of the battery pack mount portion is formed in a bent shape entering in a direction of the battery pack mount portion toward a lower side in order to support both a left and a right of the battery pack.

6. The electronic device of claim 1, wherein the electronic device has a backside, and wherein the battery pack mount portion has a mount space formed to be lower than the backside of the electronic device.

7. The electronic device of claim 6, wherein the one or more seat protrusions are configured such that they do not protrude beyond an upper side of the battery pack or the backside of the electronic device when the one or more seat protrusions are seated in the one or more seat recesses.

8. The electronic device of claim 1, wherein the electronic device includes a backside, and further comprises a detachable cover, the detachable cover being coupled to the battery pack mount portion and forming at least a portion of the backside of the electronic device.

9. The electronic device of claim 1, wherein the electronic device is a mobile terminal.

10. An electronic device comprising:
a battery pack;
a case frame having an opening forming a battery pack mount portion in which the battery pack is mounted; and
a sheet plate blocking the opening at a backside of the battery pack mount portion; wherein the battery pack comprises:
a battery cell; and
first and second support bodies supporting the battery cell on opposing ends of the battery cell;
wherein the first support body includes a recess;
wherein one or more seat protrusions protrude from the second support body to an outer direction;
wherein the battery pack mount portion comprises:
one or more seat recesses in which the one or more seat protrusions are seated; and
protrusion corresponding to the first support body recess; and
wherein when the battery pack is mounted the one or more seat protrusions are supported by the seat recesses, and the first support body recess is coupled to the corresponding protrusion.

11. An electronic device comprising:
a battery pack mount portion having an opening with a sheet plate disposed therein at a backside of the battery pack mount portion and one or more recesses arranged along one side of the battery pack mount portion and one or more protrusions arranged along another side of the battery pack mount portion;
a battery pack comprising:
a battery cell;
a first support body including one or more recesses, wherein the one or more protrusions of the battery pack mount portion fit into the one or more recesses of the first support body; and
a second support body including one or more seat protrusions protruding from one end of the second support body into the one or more recesses of the battery pack mount portion,
wherein the first support body and the second support body are on opposite sides of the battery cell.

12. The electronic device of claim 11, wherein the battery pack and the case frame define a marginal space, wherein the battery pack further comprises at least one terminal electrically connected to the battery pack mount portion.

13. The electronic device of claim 12, wherein the battery pack comprises a portion that extends into the opening.

14. The electronic device of claim 11, wherein the battery pack mount portion includes a backside, and wherein when the battery pack is mounted in the battery pack mount portion, the seat protrusion is hooked at the recess in such a way that the seat protrusion is seated in the recess, and wherein the battery pack does not apply pressure to the backside of the battery pack mount portion.

* * * * *